No. 825,667. PATENTED JULY 10, 1906.
W. J. LATCHFORD.
APPARATUS FOR PREPARING FRUIT FOR CANNING.
APPLICATION FILED JAN. 30, 1905.

3 SHEETS—SHEET 1.

No. 825,667. PATENTED JULY 10, 1906.
W. J. LATCHFORD.
APPARATUS FOR PREPARING FRUIT FOR CANNING.
APPLICATION FILED JAN. 30, 1905.

3 SHEETS—SHEET 3.

Witnesses.
Edward T. Wray.
Fred G. Fischer.

Inventor.
William J. Latchford
by Burton Burton
his Atty's

UNITED STATES PATENT OFFICE.

WILLIAM J. LATCHFORD, OF VAN WERT, OHIO, ASSIGNOR OF ONE-THIRD TO CORA M. LATCHFORD, OF VAN WERT, OHIO, ONE-THIRD TO THOMAS GAHAN, AND ONE-THIRD TO MICHAEL J. DOHERTY, OF CHICAGO, ILLINOIS.

APPARATUS FOR PREPARING FRUIT FOR CANNING.

No. 825,667.  Specification of Letters Patent.  Patented July 10, 1906.

Application filed January 30, 1905. Serial No. 243,210.

*To all whom it may concern:*

Be it known that I, WILLIAM J. LATCH-FORD, a citizen of the United States, residing at Van Wert, in the county of Van Wert and State of Ohio, have invented new and useful Improvements in Apparatus for Preparing Fruit for Canning, of which the following is a specification, reference being had to the accompanying drawings, forming a part thereof.

The purpose of this invention is to provide an improved apparatus for handling fruit in preparing it for canning, as by trimming, coring, and skinning, in which the fruit shall be handled by the operators only to the minimum amount necessary for performing the processes upon it, and in which the time of the operators lost or consumed in mere passing of the fruit from point to point shall be reduced to minimum, and in which especially a large number of operators may work in as small a place as possible and with the least embarrassment possible by reason of the necessity of disposing of the refuse and handling and measuring the fruit.

It consists in the features of construction of the apparatus herein described, as set out in the claims.

Figure 1:
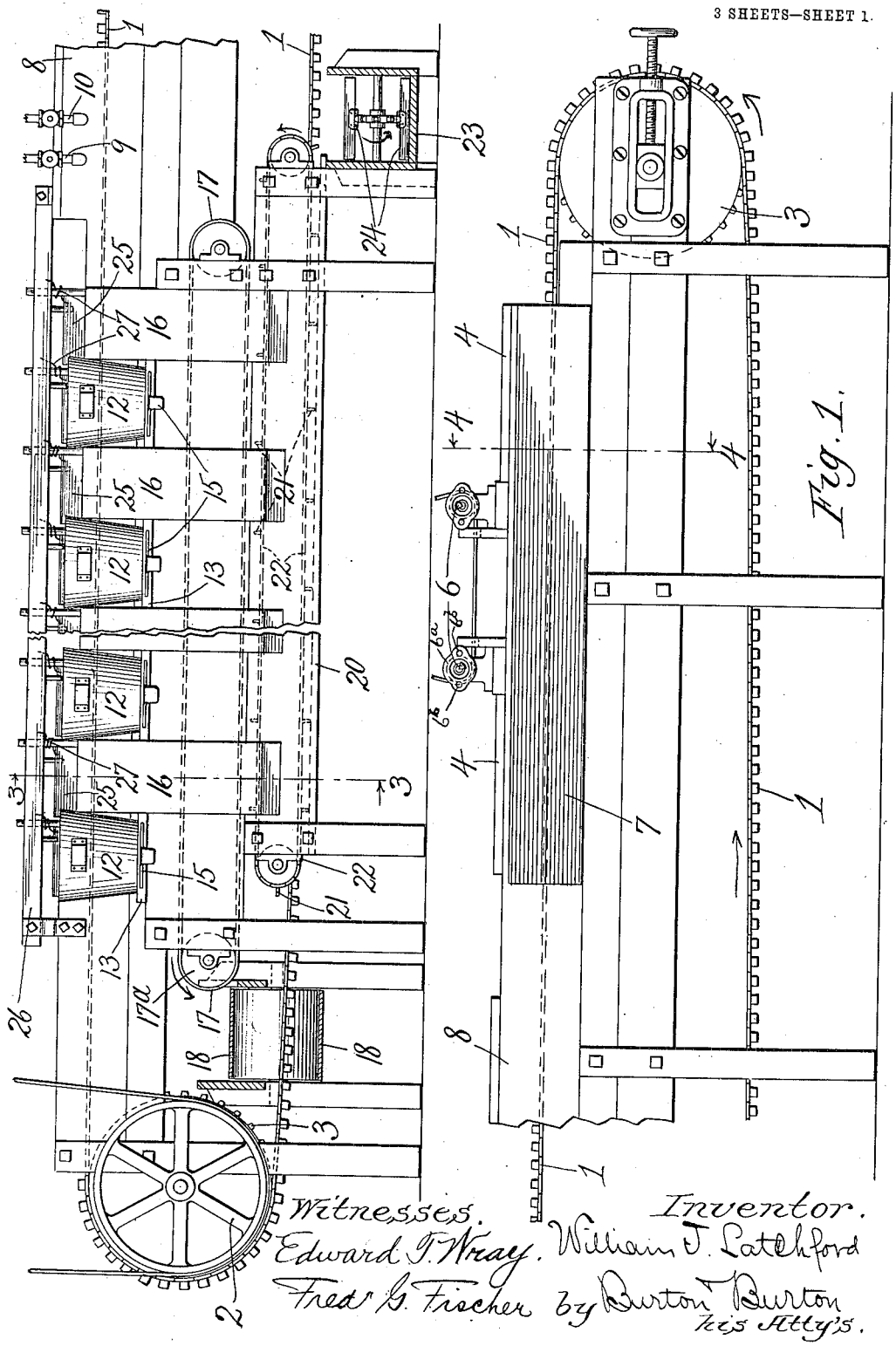
Figure 2:
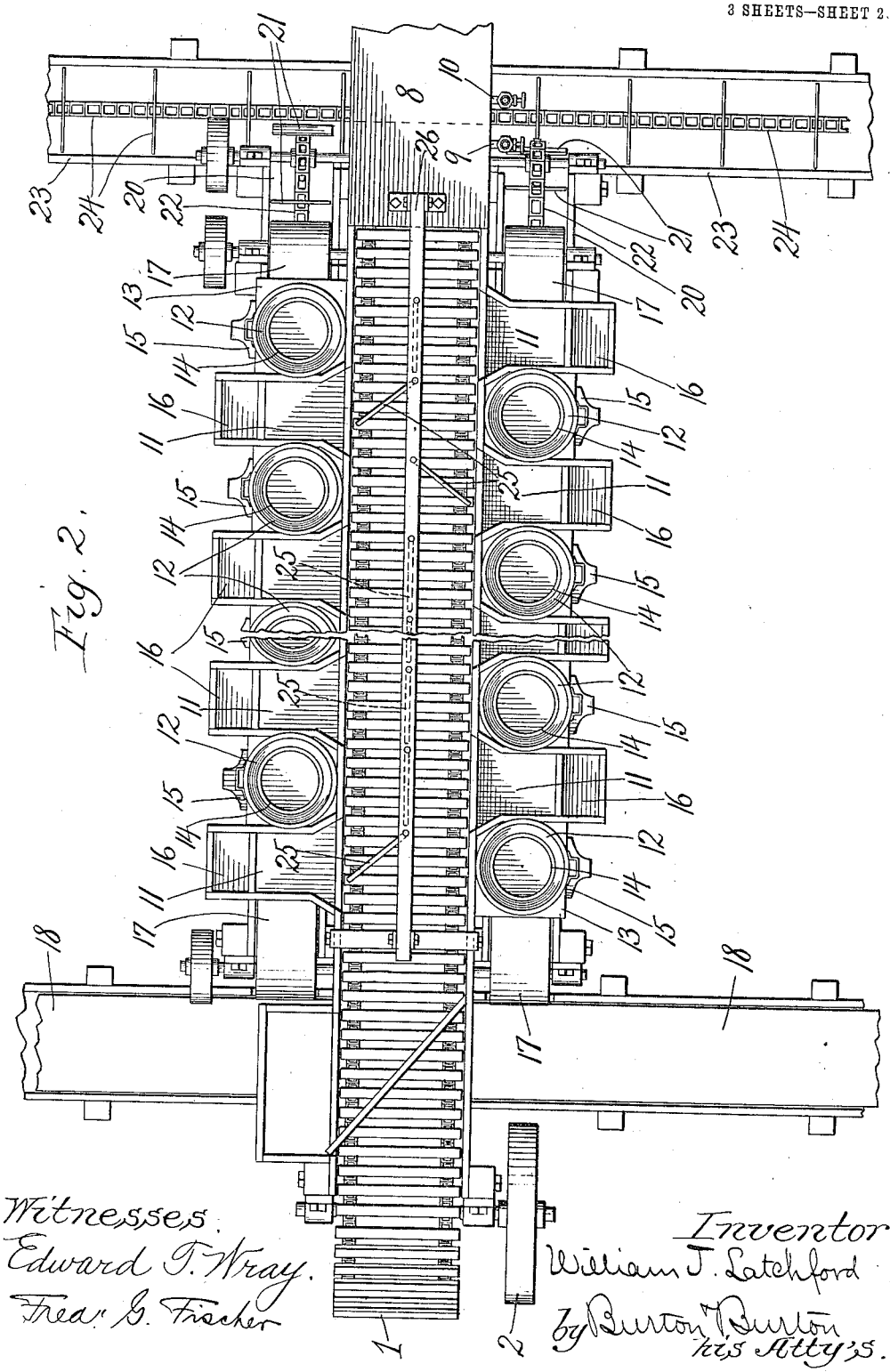
Figure 3:
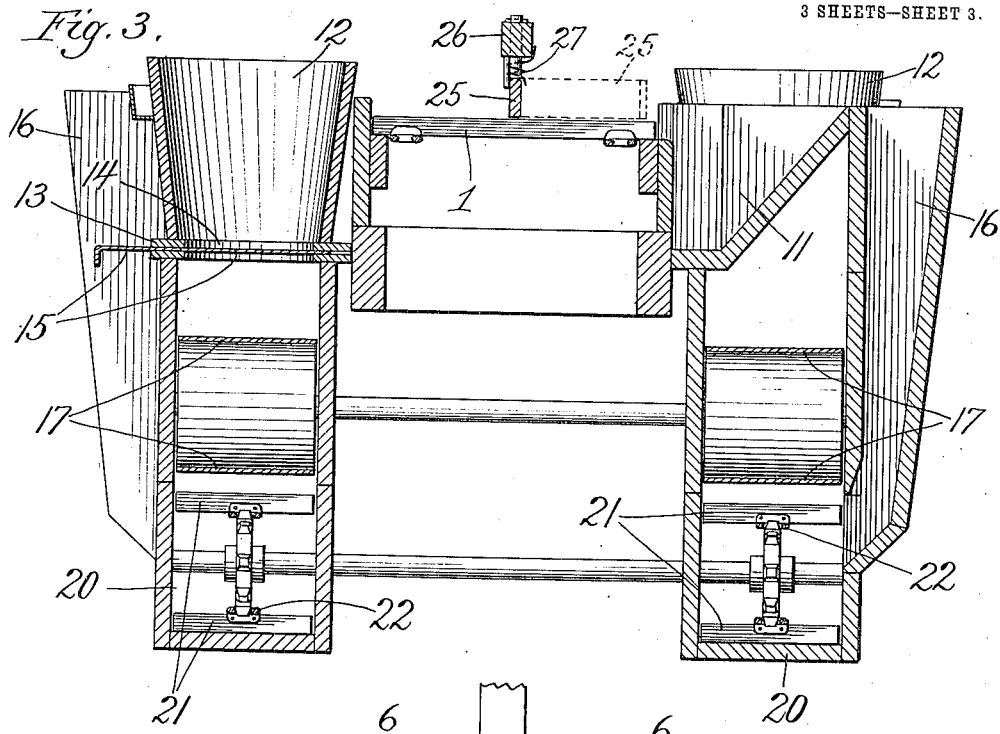
Figure 4:
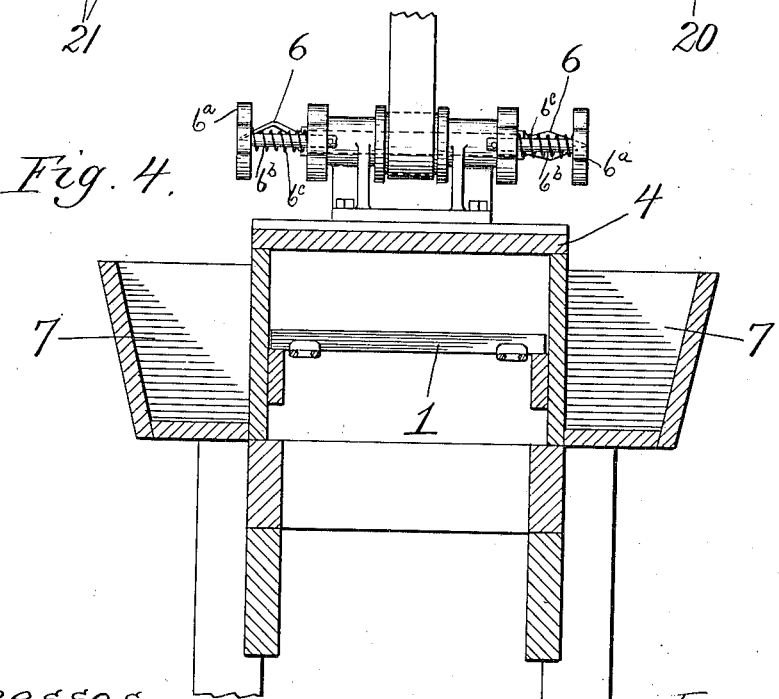

In the drawings, Figure 1 is a side elevation of one unit or complete element of the entire apparatus of which a plurality are designed to be associated together in complete operation, said figure being broken in two parts arranged side by side on Sheet 1 in order to show the apparatus in proper proportion and on sufficient scale. Fig. 2 is a plan of a portion of the machine seen in Fig. 1, comprising the latter or delivery half thereof with the skinning-stands. Fig. 3 is a section at the line 3 3 on Fig. 1. Fig. 4 is a section at the line 4 4 on Fig. 1.

In my complete apparatus it is designed to arrange side by side with intervals for the operators a plurality of machines or apparatuses, such as are shown in Fig. 1, and to extend transversely with respect to them all conveyers which shall receive the finished fruit and the refuse from each and all of them and convey it to proper destination. It is only necessary to show and describe one complete apparatus for handling and conveying the fruit and refuse to these transverse conveyers. Each such apparatus comprises an endless conveyer 1 for carrying the fruit from the first hand process through the apparatus for steaming and washing it to the position for the subsequent hand process or processes. The apparatus illustrated is primarily designed for handling tomatoes, and the first process to be performed thereon requiring the fruit to be handled by an operator is that which is technically known as "coring," but which might be more generally described as "trimming" the fruit, this process in respect to tomatoes consisting in cutting out from the stem end the rudiment of the stem and surrounding portion of the skin. This particular process in respect to tomatoes may stand for and represent any trimming process which might be necessary in respect to any fruit prior to such subsequent process or processes as might be performed upon it in preparing it for canning. The frame in which the conveyer 1 and its driving and carrying pulleys 2 and 3 is mounted supports at the receiving end the several parts or elements of what may be termed the "trimming-stand," which in the case of an apparatus designed for tomatoes comprises a table 4, which preferably extends across the upper or carrying ply of the conveyer 1 above the same, leaving abundant room under it for fruit which may be lodged upon the conveyer at the incoming side. Upon this table there are mounted the corers or trimmers 6 6. These devices are merely representative of any coring or trimming device which may be required for the fruit to be treated. For understanding the drawings, however, it may be described as consisting of a knife 6, mounted for rotation about an axis in which the terminal point of the knife stands, the knife being deflected aside from its axis back of the terminal point, so as to cut a conical hole as it revolves; an annular guard $6^a$ with a central aperture large enough to accommodate the most deflected point of the knife being mounted by means of the guide-stem $6^b$ in the bearings of the knife-shaft and being held at guarded position by a spring $6^c$, adapting it to yield back as the fruit is pressed against it for advancing onto the corer. This coring device is shown and claimed in my application, Serial No. 251,952, filed March 25, 1905, and no claims for the same are made herein. It is designed that two operators shall occupy the trimming-stand at each side of the carrier, and two corers are therefore shown at each side. The four operators handling the fruit which may be placed on the table within their reach drop it after coring on the conveyer 1, two at one side and two at the other side of the table 4. The trimming-stand comprises in addition to the table and corer two refuse-hoppers 7, of which one is shown mounted on the forward side of the frame, the other (not shown) being similarly placed at the rear side in position to receive easily from each operator the refuse cut from the fruit in the trimming. I do not limit myself to these specific elements of a trimming-stand, but they may be modified according to the requirements of the different fruit.

The upper or carrying ply of the conveyer 1 carries the fruit through the steaming and washing chamber 8. The details of this chamber need not be illustrated or described beyond the statement that it is provided with steam-pipes (represented at 9 9) and water-pipes, (represented at 10,) by which the fruit is exposed to steam or water, either or both, as the case may require, during its passage on the conveyer through this steaming-box, which may be of any necessary length to cause the fruit to remain exposed to either the steam or the water, or both, a suitable length of time to effect the cleansing and loosening of the skin, and this time and the consequent length of the box relative to the speed of the conveyer may be varied according to the character of the fruit for which the particular apparatus is constructed. Along both sides of the conveyer beyond the steamer 8 there are located a plurality of skinning-stands—that is to say, groups of devices or conveniences for skinning or performing the next necessary operation by hand upon the fruit and disposing of the cleaned fruit and refuse. Each of these skinning-stands, as illustrated, comprises three distinct elements—a fruit receiver or tablet, a fruit-hopper or measuring-receptacle, and a refuse-hopper. The fruit tablet or receiver 11 is situated relatively to the carrying-ply of the conveyer 1 so that the operator can readily draw the fruit off from the conveyer into or onto such tablet or receiver. The fruit-hopper or measuring-receptacle 12 is adjacent to the fruit receiver or tablet 11 and is designed to receive the cleaned fruit. As indicated, this hopper is designed both to conduct the cleaned fruit to a conveyer, hereinafter mentioned, and also to serve as a measuring device, so that the amount of fruit cleaned by such operator may be noted without delay and proper credit given when the work is done by the piece. In order to serve both these purposes, it is preferably constructed as shown, consisting of an inverted frusto-conical hopper, mounted fixedly upon a tablet 13, which has a round opening 14 conformed to the smaller end of the hopper and closed by a slide 15, operating on the under side of the tablet, which slide can be drawn from the forward end to discharge the contents of the fruit-hopper or measuring-receptacle upon the fruit-conveyer, hereinafter mentioned. Preferably, the fruit-receivers 11 and the fruit-hoppers or measuring-receptacles 12 alternate with each other alongside the conveyer 1, and any desired number of skinning-stands comprising these elements may be situated in succession alongside the fruit-conveyer, the number in service at any time being made to correspond to the capacity or output of the trimming-stand. The refuse-hopper 16 for each stand is preferably mounted at the opposite side of the receiver 11 from the conveyer 1, so that the operator may wipe the refuse off from the receiver into the hopper by movement of the hand in the same direction as that which is made to draw the fruit from the conveyer to the receiver 11, these two movements being naturally performed with the right hand of the operator, while the left hand will be used to pass the cleaned fruit into the fruit-hopper 12, which is situated at the left hand of the receiver in each stand. An endless conveyer 17, mounted on suitable driving and carrying pulleys, has its upper ply traveling under the discharge-mouths of all the fruit-hoppers 12, so that it may receive from them all the fruit dumped from the hoppers upon the withdrawal of the slide 15 and conduct it to the discharge end of said conveyer 17, where it is delivered over the idle pulley 17$^a$ onto a transverse conveyer consisting of an endless carrying-belt 18, which travels transversely with respect to and past all the apparatuses like that shown in Fig. 1, which may together make up the complete system. This transverse conveyer is shown broken at both sides of the single apparatus shown, indicating its indefinite extent to its driving and carrying pulleys, which are not shown. For compactness of the apparatus, however, it may be noticed that the wheels 3 3, which carry the conveyer 1, are of such size that the lower ply of said conveyer is sufficiently below the level at which the fruit can be delivered from the conveyer 17 to permit the upper or carrying ply of the transverse conveyer 18 to pass above it, and it may be found convenient to locate the pulleys for the transverse conveyer 18, so that the upper ply shall pass above and the lower ply below the lower ply of the conveyer 1, and such location of the parts is shown in the drawings. The refuse-hoppers 16 discharge at their lower ends into a shallow trough 20, in which the scrapers 21 of an endless conveyer-chain 22 operate to keep said refuse moving back to the right for discharge from the discharge end of said trough into a transversely-extending trough 23, in which a similar scraper-carrying conveyer-chain 24 operates to move the refuse from all of the assembled apparatuses to a point of final discharge. (Not shown.)

The various conveying devices of this apparatus, it may be understood, are driven by any convenient arrangement of driving belts or chains passing around suitable pulleys on the shafts of the driving-pulleys or sprocket-wheels of the different conveyers, and the specific means of thus driving the conveying elements of the apparatus need not be particularly described.

In view of the fact that the operators occupying the skinning-stands and having the fruit brought to them on the carrier 1 use for their work in skinning the fruit a knife which is carried in the right hand and that they would most naturally and easily use the right hand to take the fruit from the conveyer to their respective fruit-pockets, they would be liable to cause each other personal injury in reaching for the fruit with the hand carrying the knife if any two of them were in any instance liable to reach over the same portion of the conveyer for the fruit, and this liability would undoubtedly arise if the fruit-pockets of the skinning-stands at the two sides of the conveyer were opposite each other. For this reason, as well as to avoid any other interference of the operators with each other which might delay the work, the fruit-pockets are preferably not located directly opposite each other on the two sides, but each fruit-pocket at one side is preferably opposite the cleaned-fruit receptacle of a stand on the other side; but, further, more effectually to guard against interference of the operators I prefer to provide means for setting apart separate portions of the conveyer to the stands at the two sides thereof, and still more specifically setting apart to each stand a portion of the conveyer over which only one operator will in any event reach for supply of fruit. The means which I prefer to adopt for these purposes consists in a row of vertically-hinged gates or switches 25, which are pivotally supported upon a bar 26, extending longitudinally over the conveyer midway in the width of the latter and at a sufficient distance above the upper surface of the upper ply thereof to allow the gates or switches 25 to swing under it. Each of these gates or doors is provided with a spring 27, tending to hold it normally in a position extending longitudinally with respect to the conveyer under and in a line with the bar 26, the total effect of all said gates when thus in normal position being to partition the space above the conveyer into two lanes, one of which may serve the stands upon one side, while the other serves those upon the other side of the conveyer. The pivot-lines of these gates or doors are substantially at the transverse vertical planes between the cleaned-fruit receptacles and the fruit-pockets, respectively, and each operator will obtain from time to time a supply of fruit by deflecting the door or switch standing opposite his or her skinning-stand by drawing its free edge toward the fruit-pocket, so that the gate occupies the oblique position shown in full line with respect to certain of the gates in Fig. 2—i. e., trending obliquely across the lane or portion of the conveyer from which the fruit-pocket in question is to be supplied—so that as the conveyer travels the fruit will be deflected by the switch into the fruit-pocket toward which the switch is itself deflected. Each operator is thus supplied by manipulation of a separate gate or switch and without touching the fruit at all with the hand until it is in the fruit-pocket.

I claim—

1. An apparatus for the purpose indicated comprising a primary conveyer for the fruit; a steaming-chamber through which the primary conveyer carries the fruit; a trimming-stand adjacent to the conveyer at the entering side of the steamer; a plurality of skinning-stands adjacent to the conveyer beyond the discharge side of the steamer, each such skinning-stand comprising a separate fruit-hopper and a refuse-hopper and two conveyers to which respectively all the fruit-hoppers and all the refuse-hoppers discharge.

2. An apparatus for the purpose indicated comprising a primary conveyer for the fruit, a steaming-chamber through which the primary conveyer carries the fruit; a trimming-stand adjacent to the conveyer at the entering side of the steamer; a plurality of skinning-stands adjacent to the conveyer beyond the discharge side of the steamer, each such skinning-stand comprising a fruit-measuring receptacle and a refuse-hopper and two conveyers to which respectively all the separate fruit-measuring receptacles and all the refuse-hoppers discharge.

3. An apparatus for the purpose indicated comprising a primary conveyer for the fruit, a steaming-chamber through which the primary conveyer carries the fruit; a trimming-stand adjacent to the conveyer at the entering side of the steamer; a plurality of skinning-stands adjacent to the conveyer beyond the discharge side of the steamer, each such skinning-stand comprising a separate trap-bottomed fruit-hopper and a refuse-hopper and two conveyers to which respectively all said trap-bottomed hoppers and all the refuse-hoppers discharge.

4. An apparatus for the purpose indicated comprising a primary conveyer for the fruit; a chamber through which the conveyer carries the fruit, provided with means for treating the same without handling; a trimming-stand adjacent to the conveyer at the entering side of such chamber; a plurality of skinning-stands adjacent to the conveyer beyond the discharge side of the chamber, each such stand comprising a fruit receiver or pocket in position to receive the fruit from the conveyer; a refuse-hopper having its receiving-mouth at the opposite side of the fruit-receiver from the conveyer, and a receptacle for the cleaned fruit laterally adjacent to the receiver alongside the conveyer.

5. An apparatus for the purpose indicated comprising a primary conveyer for the fruit; a chamber provided with means for treating the fruit without handling through which the conveyer carries the fruit; a trimming-stand adjacent to the conveyer at the entering side of such chamber comprising a table extending across the conveyer above the carrying-ply, leaving said carrying-ply exposed at both sides; a plurality of skinning-stands adjacent to the conveyer beyond the discharge side of said chamber, each stand comprising a cleaned fruit hopper and a refuse-hopper, and two conveyers to which respectively all the cleaned-fruit hoppers and all the refuse-hoppers discharge.

6. An apparatus for the purpose indicated comprising a primary conveyer for the fruit; a chamber having means for treating the fruit without handling through which the primary conveyer carries the fruit; a trimming-stand adjacent to the conveyer at the entering side of such chamber; a plurality of skinning-stands adjacent to the conveyer beyond the discharge side of such chamber, each such skinning-stand comprising a fruit-hopper and a refuse-hopper; two conveyers to which respctively all the cleaned-fruit hoppers and all the refuse-hoppers discharge, and two other conveyers mounted for travel transversely to the last above-mentioned two conveyers at the delivery ends of the latter respectively in positions for receiving the discharge from said respective conveyers, said transversely-traveling conveyers having their upper plies respectively traveling between the plies of the primary conveyer.

7. In an apparatus for the purpose indicated, which comprises a conveyer for the fruit and skinning-stands located in two rows, one upon each side of the conveyer, each skinning-stand comprising a fruit receiver or pocket and a cleaned-fruit receptacle alongside the pocket, the cleaned-fruit receptacles of the stands at one side being opposite the fruit-receivers of the stands at the opposite side of the conveyer.

8. In an apparatus for the purpose indicated, in combination with a fruit-conveyer, the skinning-stands arranged in two rows, one upon each side of the conveyer; a series of vertically-pivoted switches or gates suspended above the conveyer and adapted to stand normally in line, constituting a longitudinal partition of the space above the conveyer, each skinning-stand comprising a fruit receptacle or pocket, said receptacles or pockets at one side being opposite the intervals between the receptacles or pockets at the other side of the conveyer, and the said switches being located respectively one opposite each of said pockets.

9. An apparatus for the purpose indicated comprising, in combination with a conveyer for the fruit, a plurality of skinning-stands alongside the conveyer, each comprising a fruit receiver or pocket adjacent to or lower than the carrying-surface of the conveyer; a refuse-hopper having its mouth at the opposite side of the fruit-receiver from the conveyer and in position to receive the refuse from said conveyer, and a fruit-receptacle laterally adjacent to the receiver alongside the conveyer.

10. An apparatus for the purpose indicated comprising a conveyer for the fruit; a plurality of skinning-stands alongside the conveyer, each comprising a fruit receiver or pocket in position to receive the fruit from the conveyer; a receptacle for the cleaned fruit adjacent to said fruit-receiver also alongside the conveyer; a refuse-hopper at the opposite side of the receiver from the conveyer, and two conveyers to which respectively all the cleaned-fruit receptacles and all the refuse-hoppers discharge.

In testimony whereof I have hereunto set my hand, in the presence of two witnesses, at Chicago, Illinois, this 14th day of November, 1904.

W. J. LATCHFORD.

In presence of—
FRED G. FISCHER,
J. S. ABBOTT.